United States Patent
Adamson et al.

(10) Patent No.: US 8,833,153 B2
(45) Date of Patent: Sep. 16, 2014

(54) CORRECTION OF PRESSURE SIGNALS MEASURED DURING SUPERSONIC WIND TUNNEL TESTING

(71) Applicants: Eric E. Adamson, Newcastle, WA (US); Alicia L. Bidwell, Seattle, WA (US)

(72) Inventors: Eric E. Adamson, Newcastle, WA (US); Alicia L. Bidwell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 13/623,346

(22) Filed: Sep. 20, 2012

(65) Prior Publication Data

US 2014/0076041 A1    Mar. 20, 2014

(51) Int. Cl.
   *G01M 9/00*    (2006.01)
(52) U.S. Cl.
   USPC ............................................. 73/147
(58) Field of Classification Search
   None
   See application file for complete search history.

(56) References Cited

U.S. PATENT DOCUMENTS

| | | | |
|---|---|---|---|
| 5,942,682 A * | 8/1999 | Ghetzler et al. | 73/147 |
| 7,114,387 B2 * | 10/2006 | Omotani | 73/170.02 |
| 7,302,839 B1 | 12/2007 | Felter et al. | |

OTHER PUBLICATIONS

NASA Technical Paper 3068, Mar. 1991, An Upwind-Biased Space Marching Algorithm for Supersonic Viscous Flow, Francis A. Greene, Langley Research Center, Hampton, Virginia.

* cited by examiner

*Primary Examiner* — Andre Allen
*Assistant Examiner* — Jermaine Jenkins
(74) *Attorney, Agent, or Firm* — Ostrager Chong Flaherty & Broitman P.C.

(57) ABSTRACT

A method for removing interference-induced distortion effects from an environment used to experimentally measure aerodynamic signatures. A space marching algorithm is used to extract the effects of environment including rail and wall reflections and rail edge effects to create an interference-free pressure signature.

24 Claims, 4 Drawing Sheets

CORRECTION OF PRESSURE SIGNALS MEASURED DURING SUPERSONIC WIND TUNNEL TESTING

BACKGROUND

This disclosure generally relates to the field of wind tunnel testing of aircraft designs. More specifically, this disclosure relates to systems and methods for evaluating and/or removing interference-induced distortion effects when analyzing an article under test, e.g., aircraft, aircraft part, or scale model of an aircraft or part, used to experimentally measure aerodynamic flow characteristics or signatures.

Fluid tunnels are used in a variety of applications to measure the effects of fluid flow over an object. For example, in aerodynamic testing, wind tunnels are used to measure the response of a test article, such as a scale model aircraft, to air passing over the aircraft. The wind tunnel provides a means to evaluate the test article in a controlled environment under conditions that are dynamically similar to conditions to which a full-size version of the aircraft may be subjected in actual flight. Air in the wind tunnel flows over the scale model aircraft at a controlled speed in order to evaluate the aerodynamic response of the scale model aircraft at different positions and attitudes. The attitude of the scale model aircraft may be defined in terms of roll, pitch, and yaw about the respective longitudinal, lateral, and vertical axes of the aircraft.

Scale model aircraft in a wind tunnel may be supported by a variety of different means including, but not limited to, a sting and balance mechanism extending out of an aft end of the aircraft. The sting forms part of a support mechanism for the aircraft and provides the ability to statically position or dynamically move the aircraft. For example, in changing the pitch angle of the aircraft, the sting may rotate the aircraft from a current attitude (e.g., a zero-pitch attitude or horizontal attitude) to a positive pitch attitude wherein the forward end of the aircraft is pointing upwardly relative to horizontal. In the positive pitch attitude, the wings of the aircraft may be oriented at a positive angle of attack relative to the direction of fluid flow through the wind tunnel. The direction of fluid flow may be assumed to be generally parallel to the tunnel walls or to the tunnel centerline, which may also be assumed to be horizontal.

The science of experimental measurement of off-body pressure signals emanating from supersonic wind tunnel models has existed since the 1940s. In the 1960s the fundamental theories of low sonic boom design were developed and experimentally validated. To perform the experimental validation of designs, it became common practice to obtain readings of the pressure signal at 100 or more locations with a static pressure probe. Typically the signal was painstakingly measured at one location at a time, by either traversing the probe thru the signal produced by a model at a stationary location, or by traversing the model over a stationary probe. In more recent times it has been found to be more cost effective and potentially more accurate to use techniques and hardware that can obtain readings at 100 to 500 locations simultaneously. An approach to enable the measurement of hundreds of off-body pressure signals simultaneously is to manufacture a pipe, plate, or rail (connected segments or one piece), with rows of tapped static pressure ports manufactured into the surface.

In the case of a pressure rail, if the rail has a finite width at the top and is placed a finite height from a tunnel wall, the pressure signals seen by a pressure rail used for sonic boom measurement may be significantly distorted by a number of fluidic phenomena. The phenomena include, but are not limited to, boundary layer dissipation, signals reflected off the rail surfaces, and signals reflected off the wind tunnel walls. Depending on the characteristics of the facility, the test conditions, the signal characteristics generated by a specific model, and the geometry of the rail, the rail will experience different levels of distortion relative to what the model would produce under the most ideal conditions. The existing solutions are to accept the distortion, develop distortion limiting measurement hardware, or not use a pressure rail at all. Using an alternate technique, like a pressure probe and translating model, increases the time to obtain a pressure signature from seconds to 30 minutes or more. Low-interference rails use up large portions of a wind tunnel test section. This translates to a requirement to only test in the largest and most expensive wind tunnels, driving up data acquisition cost.

For some combinations of rail geometry, model geometry, wind tunnel facility, and test conditions, very low levels of distortion are achievable. In situations where the application of a low-interference approach is uneconomical or impractical, due to model geometry, facility characteristics, or test condition requirements, an effective method of correcting for pressure probe and tunnel wall interferences would be highly advantageous.

Accordingly, there is a need for a method to correct measured off-body pressure signals for major interferences during wind tunnel testing, so that a higher-quality pressure signature can be calculated from the measured data.

SUMMARY

Disclosed hereinafter are aspects and features of systems and methods for extracting (numerically) the primary sources of distortion out of the off-body pressure signals measured by a pressure probe, for example, when measuring a response during aerodynamic testing of a test article, e.g., actual aircraft, part, or portion thereof, or scale model of an aircraft or part, thereof to wind tunnel measurements, in situations where the interferences may be large and be of significance to a user. In accordance with one embodiment to be disclosed, a space marching algorithm is used to extract the interference effects of the pressure probe and wind tunnel wall to create an interference-free pressure signature. The space marching algorithm comprises a test-dependent equation cast as a mathematically parabolic equation in one coordinate direction and marched along that coordinate.

In one instance, the space marching algorithm disclosed herein calculates the pressure state of the pressure probe at a specific location therealong based on the pressure state at all preceding (i.e., upstream) locations. In the instant application, the space marching algorithm is used in the numerical simulation of fluidic flows at supersonic conditions. In particular, the algorithm simulates the removal of probe- and wall-induced distortions from output pressure signal measurements. This allows more flexibility in the choice of probe geometry and wing tunnel selection to significantly reduce the overall costs of a test program.

In accordance with the method disclosed hereinafter, off-body pressure signals produced by a model and supersonic flow inside a wind tunnel are measured using a pressure rail and the resulting pressure signature is decomposed (numerically) into its constituent parts. The constituent parts of interest include a rail reflection pressure signature component, a rail edge pressure signature component, and a wall reflection pressure signature component. By numerically removing these signature components from the resultant rail pressure signature, a data processor can derive a simulated distortion-free off-body pressure signature that has significant rail and wall interference effects removed.

As disclosed supra, a wind tunnel data processor is programmed to execute an algorithm that simulates a distortion-free pressure signature has several advantages, including the ability to correct the pressure data that may be highly distorted by the interference effects of the rail measurement hardware and the wind tunnel. This numerical simulation has been validated to work successfully both with computational fluid dynamics (CFD) and wind tunnel test experimentation. The space marching algorithm can be used to predict the full model/tunnel/rail CFD results from the isolated model alone CFD results or the isolated model alone CFD results from the full model/tunnel/rail CFD results.

In accordance with one aspect of the disclosed subject matter, a method for numerically simulating an off-body pressure signature having reduced interference-induced distortion comprises the following steps. Parameter values are acquired for each pressure port of a pressure probe comprising a multiplicity of pressure ports. Corrected parameter values are calculated for each pressure port of a first group of pressure ports of the pressure probe using a first mathematical formula that removes the effects of reflections from a top of the pressure probe.

In one instance, corrected parameter values are calculated for each pressure port of a second group of pressure ports of the pressure probe using a second mathematical formula that removes the effects of reflections from a top of the pressure probe and the effects of interactions with an edge of the pressure probe, the second group being located aft of the first group. Corrected parameter values for each pressure port of a third group of pressure ports of the pressure probe using a third mathematical formula that removes the effects of reflections from a top of the pressure probe, the effects of interactions with an edge or edges of the pressure probe, and the effects of reflections from a wall or walls of the wind tunnel, the third group being located aft of the second group. The corrected parameter values for the first, second and third groups of pressure ports are aggregated to form a pressure signature, which pressure signature is then made available for additional calculations, display on a screen, or data archival.

In accordance with one aspect of the disclosed subject matter, a method for numerically simulating an off-body pressure signature having reduced interference-induced distortion comprises the steps of determining the values of first, second and third interference factors and performing calculations for each pressure port of a pressure probe. These interference factors are respective functions of numerically simulated or empirically derived pressure signals which have reflected off a top of the pressure probe, which have interacted with an edge of the pressure probe, and which have reflected off a wall of the wind tunnel, respectively. While air is flowing through the test section of the wind tunnel, the pressures exerted at respective pressure ports of the pressure probe are transduced into respective pressure signals. Measured parameter values (e.g., the difference between a measured static pressure and the free-stream static pressure divided by the free-stream static pressure) are derived from these pressure signals respective measured parameter values for each pressure port.

In one instance, a first set of weighted parameter values are calculated from respective measured parameter values for each pressure port, the weighted parameter values being calculated by multiplying the first interference factor times the measured parameter values for each pressure port. A second set of weighted parameter values are calculated from respective corrected parameter values for each of (j+1)-th through n-th pressure ports, these weighted parameter values being calculated by multiplying the second interference factor times the corrected parameter value for a respective pressure port located j ports forward of each of the (j+1)-th through n-th pressure ports for which a corrected parameter value is being calculated, where j and n are positive integers and j<n.

In yet another instance, additional set(s), e.g., a third set of weighted parameter values are calculated from respective corrected parameter values for each of the (k+1)-th through n-th pressure ports, these weighted parameter values being calculated by multiplying the third interference factor times the corrected parameter value for a respective pressure port located k ports forward of each of the (k+1)-th through n-th pressure ports for which a corrected parameter value is being calculated, where j<k<n. The corrected parameter values are derived by combining the measured parameter values with the first, second and third sets of weighted parameter values in accordance with a space marching algorithm. The result of the foregoing calculations will be a series of corrected DP/P values which can be graphed to form a curve representing the original pressure signal (without interference effects) as it varies in the X-direction.

Another aspect of the disclosed subject matter is a computer system that executes the space marching algorithm described above.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

FIG. 3 also shows a rail top reflection image (••••), a rail edge effect image (- - -), and a tunnel wall reflection image (—··—··), which distortion effects can be removed from the measured rail pressure signature by application of the method disclosed herein for correcting pressure rail static pressure measurements for rail- and wall-induced interferences. A corrected rail pressure signature simulating the original distortion-free pressure signature that would have been acquired in the absence of interference effects is shown as a dashed line (- - - -).

Reference will hereinafter be made to the drawings in which similar elements in different drawings bear the same reference numerals.

DETAILED DESCRIPTION

The following detailed disclosure describes a system and method for measuring off-body pressure signals, for example, when measuring a response during aerodynamic testing of a test article, e.g., such as an aircraft, aircraft part, and/or a scale model of an aircraft or portion or part thereof in a wind tunnel which overcomes a disadvantage of conventional systems, e.g., conventional wind or fluid tunnel systems. The system comprises a pressure probe (e.g., in the form of a rail, plate or pipe) that has multiple static pressure ports which are evenly distributed along the length of the probe. The number of ports (and their spacing) may be varied, e.g., from 50 to 500. It is anticipated that one skilled in the art would recognize that the number, spacing, and other properties of the system would likely be changed for different applications, models, wind tunnels, and other test variables.

Figure 1:
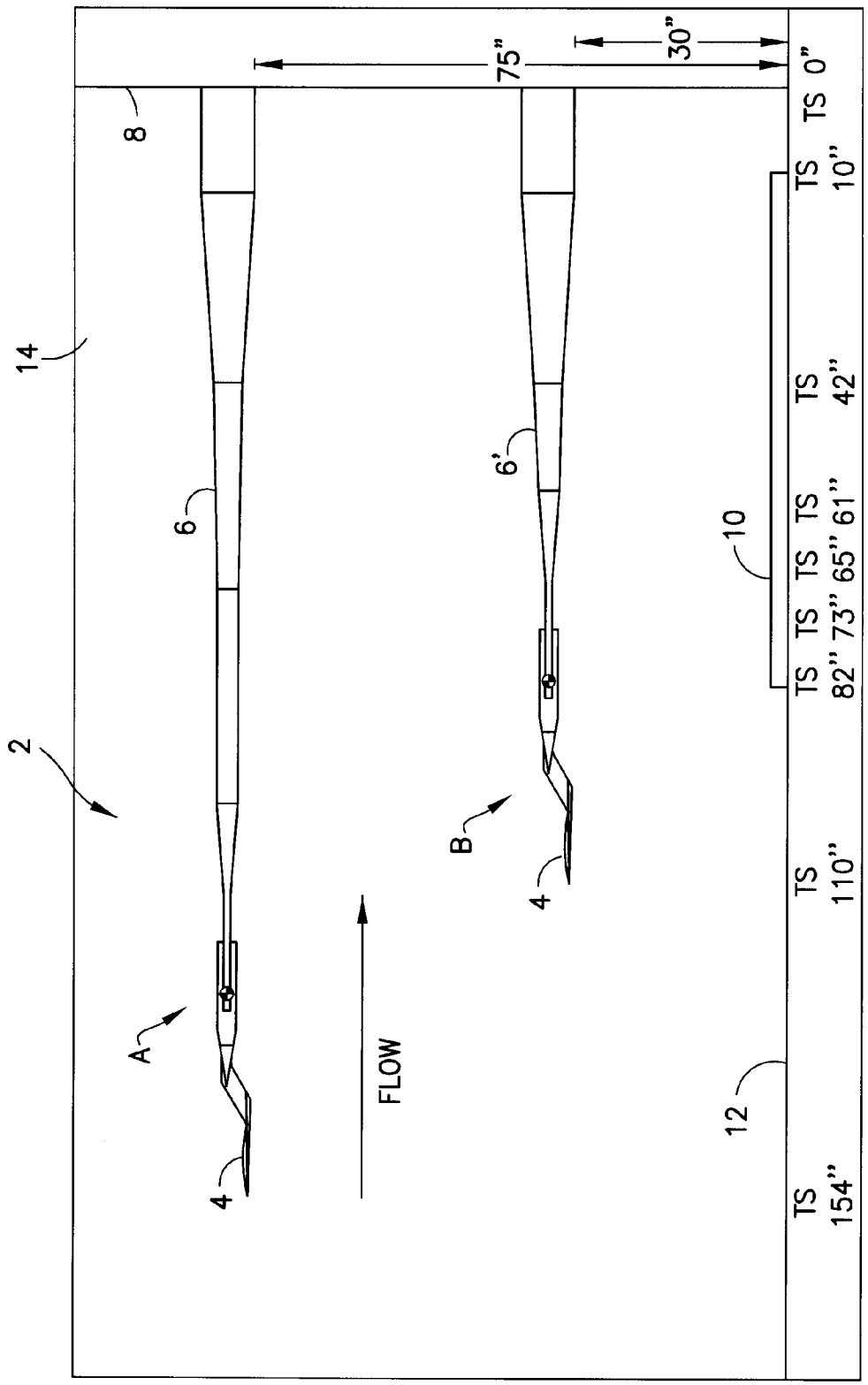
FIG. 1 is a diagram showing a side view of a wind tunnel model.

A conventional wind tunnel system for testing models is shown in FIG. 1. Only the floor 12 and the back wall 14 of a wind tunnel 2 are shown; the ceiling and front wall are not shown. In terms of flow, when in normal operation, high-speed flow will be directed from the front of the tunnel 2 and out the rear opening, as indicated by the arrow labeled "FLOW" in FIG. 1.

Alternative model setups A and B are shown disposed inside wind tunnel 2, each model setup comprising a model 4 supported by a sting support (6 or 6'). In these alternative embodiments, the sting support 6 for model setup A is located at a height of 75 inches above the wind tunnel floor 12, whereas the sting support 6 for model setup B is located at a height of 30 inches above the wind tunnel floor 12. Below support 6' is a pressure probe 10 which is used to take off-body pressure readings from the flow field induced by the model 4, as will be described in more detail hereinafter. The sting support (6 or 6') for each model setup is supported on an outcropping 8 which is part of and fixed to the overall wind tunnel pitch strut assembly.

In the embodiment depicted in FIG. 1, the probe is a pressure rail that is 6 feet long, extending from TS (Tunnel Station) 10" to TS 82". (Tunnel Station is a dimension of length in the direction of flow.) Preferably the rail has a constant cross-sectional shape along its length with height just above the sonic line. The rail may comprise a flat top having a line of spaced orifices (not visible in FIG. 1) connected to pressure transducers located outside the test section. The orifices are connected to steel pressure tubing, and then flexible nylon tubing to allow the pressure signal to be carried from the rail orifices, thru the wind tunnel test section wall, and out to the pressure transducers.

FIG. 1 depicts two alternative model setups A and B for illustrative purposes only. The respective model setups have different propagation (i.e., separation) distances to the pressure rail. The model setup A has a relatively longer separation distance which is about five body lengths, while the model setup B has a relatively shorter separation distance which is about two body lengths. For a real airplane, the total propagation distance from the aircraft to the ground can be over 200 body lengths, so it is obviously important to be able to test with sufficiently large separations. Usually the off-body pressure signals become fairly mature around three to ten body lengths away. The downside is that signal strength decreases linearly with the separation distance. If the separation distance is too large, the tester loses the ability to separate the pressure signal from the noise because the model induced pressure signals becomes so small and the pressure modules are not accurate enough. In practice, one can balance signal strength with signal maturity by testing a several of different separation distances, using smaller or larger models.

In accordance with the embodiment depicted in FIG. 1, the probe 10 is a pressure rail comprising a multiplicity of static pressure taps (e.g., 512) distributed along the probe length at spacing intervals. The probe instrumentation comprises Electronic Pressure Scanning (EPS) modules, which are used to measure the static pressure distribution through the test section of the wind tunnel. Each module comprises a respective plurality of silicon diaphragm pressure transducers, which are well known in the aerospace industry for use in wind tunnel, flight test and acoustic measurements.

The pressure rail 10 shown in FIG. 1 detects pressure signals impinging at discrete spaced locations along its length. As previously described, the detected pressure signals include the effects of rail- and wall-induced interference. It is desirable to remove these interference effects to arrive at a pressure signature representing the off-body pressure signals received during wind tunnel testing.

Figure 2:
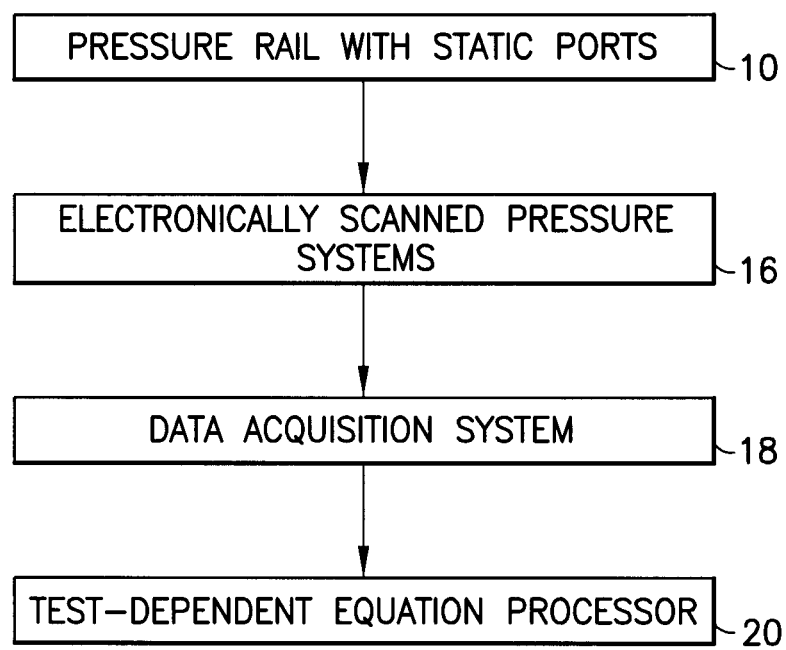
FIG. 2 is a block diagram showing a system for correcting the measured off-body pressure signals emanating from a wind tunnel model in accordance with one embodiment.

FIG. 2 shows a system for numerically simulating a signature comprising off-body pressure signals which would have been detected in the absence of the aforementioned interference effects. As previously described, this system comprises a pressure rail 10 with multiple ports. EPS modules 16 (installed inside the hollow pressure rail) provide high-accuracy measurement of steady-state rail pressures at a high data rate. The system utilizes plug-in EPS modules each containing 32 individual pressure transducers, which are addressed and scanned at a rate of 10,000 ports/sec. The pressure transducers are aligned along the rail axis, which is parallel to the flow direction. A total of 16 EPS modules with transducer pressure ranges from 2.5 psi to 500 psi may be used to provide a total of 512 rail pressure channels, depending on the rail size and density of pressure ports. Reference and check pressures are obtained from remotely controlled regulators.

An on-line calibration of all transducers is normally performed periodically by the operation of a pneumatic valve in each module which switches the system into a calibrate mode. Three calibration pressures, measured with precision digital quartz transducers, are applied in up to three ranges to assure overall system errors are not greater than ±0.1 percent of full scale.

Still referring to FIG. 2, a computer-based, real time, data acquisition, display, and recording system 18 is used to process the pressure data from the EPS modules. Analog data from the experiments are digitized and then acquired by the computer of data acquisition system 18. The recorded data can be processed in real time or transmitted through a network link to a mainframe computer or laptop computer for post-processing. Real-time processing tasks include acquiring data, converting raw counts to engineering units, performing on-line calculations, updating facility display devices (both alphanumeric and graphical) and transmitting data for archival recording on a data collector. Data can be acquired and processed using standard data software modules along with software specifically designed and programmed for a particular test. In accordance with one embodiment, the acquired data can be processed by a test-dependent equation processor 20 that executes a space marching algorithm that enables the numerical simulation of a distortion-free pressure signature based on the pressure data derived from the outputs of the ESP modules.

The amount of distortion/interference a pressure rail will measure will be a function of the strengths of the original signal, the rail's height and width, the characteristics of the wind tunnel it is being tested in, and the Mach number being tested. The method performed by the test-dependent equation processor provides a correction for three of the primary interferences: reflections off of the top of the rail; an edge effect that is the product of the rail's finite width; and the tunnel wall reflections that are a product of the rail's finite height.

Figure 3:
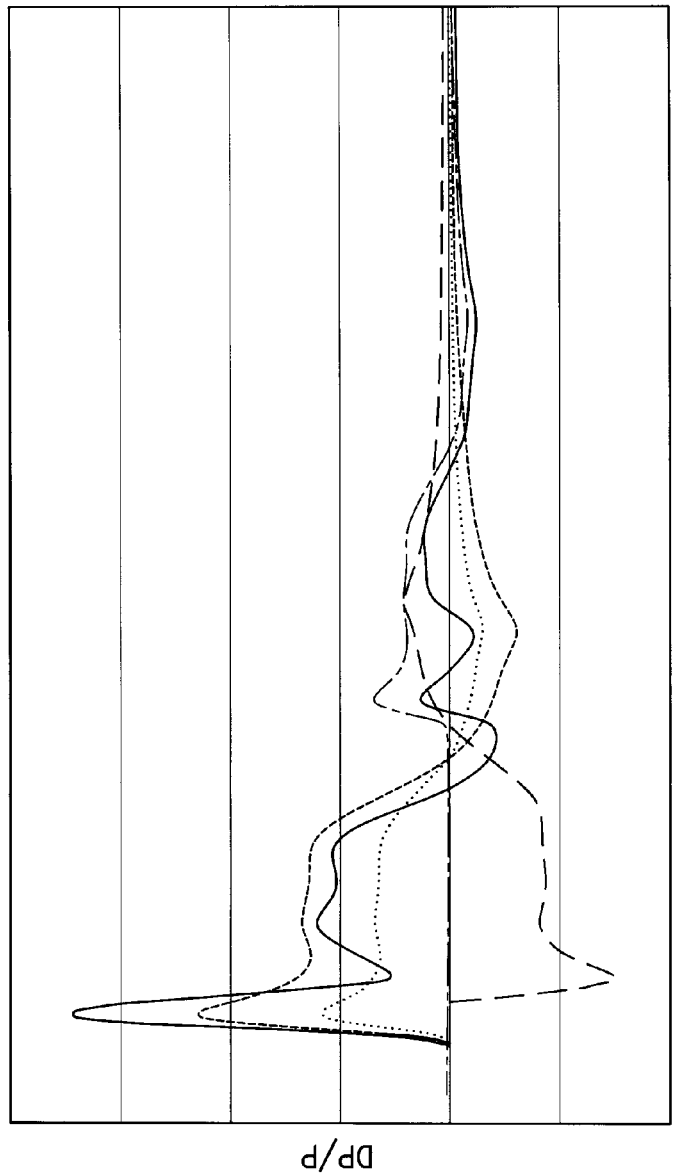
FIG. 3 is a graph showing a measured rail pressure signature (——) acquired from a pressure rail during model testing in a wind tunnel at supersonic speed.

FIG. 3 shows images of five pressure signatures, including a composite pressure signature (seen as a thin continuous line) derived from pressure signals produced by a pressure rail (hereinafter "resultant rail pressure signature") during wind tunnel testing of a model at supersonic speed. The graph seen in FIG. 3 plots the values of parameter DP/P (vertical axis) versus longitudinal position X, wherein the DP/P values are computed based in part on measurements of the static pressure at locations X corresponding to respective pressure taps integrated into the pressure rail. How one calculates pressure in a wind tunnel is well known to a person skilled in the art. In particular, the parameter DP/P for each port i is the ratio of a measured static pressure at port i minus the free-stream static pressure divided by the free-stream static pressure:

$$((DP/P)_{measured})_{port\ i} = (P_{port\ i} - P_{free-stream})/P_{free-stream}$$

The location where the free-stream static pressure is measured is unimportant and varies by facility. In some cases it is a calculated value from the facility's calibration data; in other cases it is measured by a probe installed somewhere in the test section of the wind tunnel.

The resultant rail pressure signature (the continuous line in FIG. 3) can be treated as a composite signature having the following four simulated components: an original pressure signature (undistorted by interference effects), a rail top pressure signature that combines pressure signals that were reflected from the top of the pressure rail, a rail edge pressure signature that combines pressure signals due to effects of the rail edges, and a tunnel wall pressure signature that combines pressure signals reflected from the wind tunnel wall.

As illustrated in FIG. 3, a simulated original pressure signature is depicted as a line of short dashes (- - - -); an image of the simulated rail top reflection is depicted as a dotted line (• • • •); an image of the simulated rail edge effect is depicted as a line of long dashes (— — —); and an image of the simulated tunnel wall reflection is depicted as a line of alternating long and short dashes (— • — •).

The correction method disclosed herein enables the test-dependent equation processor to extract the original pressure signal from the rail pressure signal resulting from a wind tunnel test of a model. The correction method can also be used to extract a pressure signal from a rail pressure signal that is the result of computational fluid dynamics (CFD) calculations.

The rail top interference, which comprises signals reflected off the rail top surface, will be a function of the facility characteristics and the rail geometry. Ideally, this reflection effectively doubles the strength (a 100% increase) of the original signal. In practice, the signal will be increased by as high as 95% and as low as only 20%. The exact value of the rail reflection factor Γ to be used for a particular facility/rail can be estimated from linear supersonic theory, obtained from CFD calculations, or determined empirically through the testing of calibration models of known shape and signal production. Depending on the facility and rail design, Γ can effectively have one value or vary along the length of the rail. For a short rail in a facility with a large boundary layer, Γ will gradually decrease as one moves from the front of the rail to the back. If the rail is tall and the tunnel boundary layer is thin, Γ will be very close to the theoretical value of 2.

The next interference, the rail edge effect, is also a function of facility characteristics and rail geometry. Its effect is seen in FIG. 3 as an inverted and somewhat dissipated image of the original signal that has been displaced aft in the direction of the tunnel flow (compare the dotted line to the boldfaced continuous line). The dissipation is a product of the signal having to propagate the signal though wind tunnel- and rail hardware-induced boundary layers.

In one instance, the displacement aft of this image (the dotted line in FIG. 3) is a product of the edge signal needing to propagate along Mach lines across the rail top to the static pressure ports. Ideally the edge effect is of the same magnitude as the original signal and the displacement is the distance between the rail edge and the static ports multiplied by $\beta = \sqrt{Mach^2 - 1}$. In practice, the amplitude of the edge effect can be as low as 60% of the amplitude of the original signal and the shift can be as small as 20% of the ideal value. The particular values of a rail edge effect factor Ω and a rail edge effect signal shift j to be used for a particular facility/rail can be estimated from linear supersonic theory, obtained from CFD calculations, or determined experimentally through the testing of calibration models of known shape and signal production.

The last interference, the tunnel wall reflection effect, is a function of the facility characteristics and the rail geometry as well. Its effect is seen as a somewhat dissipated image of the original signal that has been displaced aft in the direction of the tunnel flow (compare the dash-dot line to the boldfaced continuous line). The dissipation is a product of the signal having to propagate though the wind tunnel- and rail hardware-induced boundary layers. The displacement aft of this image is a product of the wall reflection signal needing to propagate along Mach lines down to the tunnel wall, back up again, and across the rail top to the static pressure ports.

Ideally the wall reflection is the same magnitude of the original signal and the displacement is the distance between the rail edge and the static ports and two times the rail height multiplied by $\beta = \sqrt{Mach^2 - 1}$. In practice, the amplitude of the wall reflection can be as low as 10% of the amplitude of the original pressure signal and the shift can be as small as 10% of the ideal value. The particular values of a tunnel wall reflection factor Φ and a tunnel wall reflection signal shift k to be used for a particular facility/rail can be estimated from linear supersonic theory, obtained from CFD calculations, or determined experimentally thru the testing of calibration models of known shape and signal production.

In accordance with various embodiments, a computer system extracts the original pressure signal from the resultant rail pressure signal by executing a space marching algorithm, solving for DP/P at the most forward upstream port and then progresses downstream, solving for DP/P at each successive port in turn. The algorithm can be executed by the wind tunnel data acquisition system processor or in an external system that calculates test-dependent equations. Six facility, test condition, rail geometry-specific terms are applied: a rail top reflection factor, a rail edge effect factor, an edge effect shift, a tunnel wall reflection factor, a tunnel wall reflection shift, and the number of pressure ports. When these terms are applied, the measured wind tunnel signature is effectively decomposed into its constituent parts comprising an original pressure signal, a rail top reflection image, a rail edge effect image, and a tunnel wall reflection image (as graphically depicted in FIG. 3). The first five terms may be obtained from CFD, experiment or theory.

In accordance with one embodiment, the algorithm is written as follows:
Γ=rail top reflection factor with dissipation
Ω=rail edge effect factor
Φ=tunnel wall reflection factor
j=effective number of pressure ports by which the rail edge effect is shifted aft or downstream
k=effective number of pressure ports by which the tunnel wall reflection is shifted aft or downstream
n=number of pressure ports
From i=1 to i=n calculate:

$$((DP/P)_{measured})_{port\ i} = (P_{port\ i} - P_{free-stream})/P_{free-stream}$$

If i−k<1 then $((DP/P)_{corrected})_{port\ k} = 0$

If $i-j<1$ then $((DP/P)_{corrected})_{port\ j}=0$ $((DP/P)_{corrected})_{port\ i} = ((DP/P)_{measured})_{port\ i} - (\Gamma \times ((DP/P)_{measured})_{port\ i}) + (\Omega \times ((DP/P)_{corrected})_{port\ (i-j)}) - (\Phi \times ((DP/P)_{corrected})_{port(i-k)})$ End To use the foregoing algorithm, the third and fourth terms must be calculated at all ports, i=1 to n, in sequence. That is why "if" statements are required to define when them third and fourth terms are set to zero. Alternatively, one could write an algorithm with three nested loops instead of one, in which case the third term would be calculated only for ports (j+1) through n and the fourth term would be calculated only for ports (k+1) through n, where j<k<n. Or, in accordance with a further alternative embodiment, one could write an algorithm that includes the third term only when i>j and that includes the fourth term only when i>k, where k>j. These alternative algorithms would work the same but they would look different than the algorithm set forth in detail above and in a code.

The foregoing equation represents a method for numerically simulating an off-body pressure signature having reduced interference-induced distortion in accordance with one embodiment. This correction method comprises the steps of determining the values of first, second and third interference factors (e.g., $\Gamma$, $\Omega$ and $\Phi$) and performing the calculations indicated by the equation for $((DP/P)_{corrected})_{port\ i}$. While air is flowing through the test section of the wind tunnel, the pressures exerted at respective pressure ports of the pressure probe are transduced into respective pressure signals.

Measured parameter values are derived from these pressure signals respective measured parameter values for each pressure port (the first term on the right-hand side of the equation). In one instance, the second term on the right-hand side of the equation calculates respective weighted parameter values from respective measured parameter values for each pressure port, the weighted parameter values being calculated by multiplying the first interference factor times the measured parameter values for each pressure port. In additional instance, the third term on the right-hand side of the equation calculates respective weighted parameter values from respective corrected parameter values for each of the (i+1)-th through n-th pressure ports, these weighted parameter values being calculated by multiplying the second interference factor times the corrected parameter value for a respective pressure port located j ports forward of each of the (i+1)-th through n-th pressure ports for which a corrected parameter value is being calculated, where j and n are positive integers and j<n.

In another example, a fourth term on the right-hand side of the equation calculates respective weighted parameter values from respective corrected parameter values for each of the (k+1)-th through n-th pressure ports, these weighted parameter values being calculated by multiplying the third interference factor times the corrected parameter value for a respective pressure port located k ports forward of each of the (k+1)-th through n-th pressure ports for which a corrected parameter value is being calculated, where j<k<n.

The result of the foregoing calculations will be a series of corrected DP/P values which can be graphed to form a curve representing the original pressure signal (without interference effects) as it varies in the X-direction (see FIG. 3).

Figure 4:
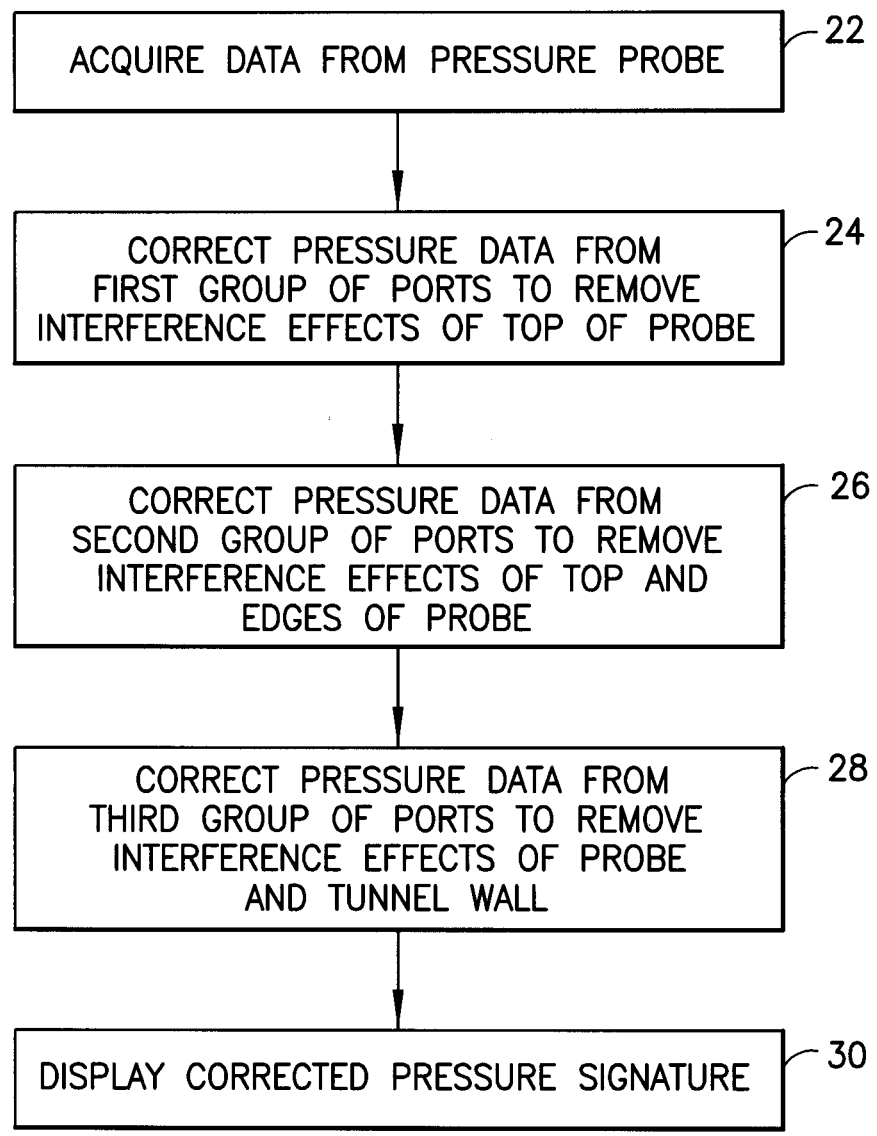
FIG. 4 is a flowchart showing a sequence of operations in accordance with one embodiment of the correction method disclosed herein.

FIG. 4 is a flowchart showing a sequence of operations in accordance with one embodiment of a method for numerically simulating an off-body pressure signature having reduced interference-induced distortion. Parameter values are acquired for each pressure port of a pressure probe comprising a multiplicity of pressure ports (step 22). Corrected parameter values are calculated for each pressure port of a first group of pressure ports of the pressure probe using a first mathematical formula that removes the effects of reflections from a top of the pressure probe (step 24).

Corrected parameter values are calculated for each pressure port of a second group of pressure ports of the pressure probe using a second mathematical formula that removes the effects of reflections from a top of the pressure probe and the effects of interactions with an edge of the pressure probe (step 26), the second group being located aft of the first group. Corrected parameter values for each pressure port of a third group of pressure ports of the pressure probe using a third mathematical formula that removes the effects of reflections from a top of the pressure probe, the effects of interactions with an edge or edges of the pressure probe, and the effects of reflections from a wall or walls of the wind tunnel (step 28), the third group being located aft of the second group. The corrected parameter values for the first, second and third groups of pressure ports are aggregated to form a pressure signature, which pressure signature is then displayed on a display screen (step 30).

The parameter values can be acquired by wind tunnel testing of a model or by numerical simulation of wind tunnel testing of a model. In the former case, the correction method further comprises the following steps: installing a model and a pressure probe in a test section of a wind tunnel, the pressure probe being disposed aft of the model; causing air to flow through the test section of the wind tunnel in a flow direction; while air is flowing through the test section of the wind tunnel, transducing pressures exerted at respective pressure ports of the pressure probe into respective pressure signals; and deriving from the pressure signals respective measured parameter values for each pressure port.

It should be appreciated that the rail top reflection, rail edge effect and tunnel wall reflection factors will vary depending on the height, width and shape of the pressure rail. The inventors have applied the system and method disclosed herein to correct test data from rails as short as 12 mm and as tall as 52 mm, as narrow as 20 mm and as wide as 100 mm. The correction method disclosed herein produced consistent results for all rails tested.

The system and method disclosed herein provide an algorithm to remove the rail-induced distortion from output pressure signal measurements in a wind tunnel. The ability to remove such distortion allows more flexibility in the choice of rail geometry and wind tunnel selection to significantly reduce the overall costs of a test program. For example, in a situation where the wind tunnel size precludes the use of a tall rail that may require no data correction, the correction method disclosed herein enables the user to use a smaller rail despite the fact that the output pressure signals may suffer from increased distortion as compared to the signal output by a taller pressure rail.

While the disclosure has been described with reference to various embodiments, it will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed.

As used in the claims, the term "computer system" should be construed broadly to encompass a system having at least one computer or processor, and which may have two or more interconnected computers or processors; and the term "pressure probe" should be construed broadly to encompass any device comprising an elongated support structure (such as a rail, an elongated plate, a pipe or any segmented variation thereof) and a multitude of pressure transducers supported by that elongated support structure. For example, pressure rail 10 shown in FIG. 1 qualifies as such a pressure probe.

The method claims set forth hereinafter should not be construed to require that the steps recited therein be performed in alphabetical order or in the order in which they are recited.

The invention claimed is:

1. A method for reducing interference-induced distortion by an off-body pressure signature while air is flowing through a test section of a wind tunnel, the method comprising:
    determining a value of a first interference factor associated with a first interference effect that occurs inside the test section of the wind tunnel during model testing;
    installing a model and a pressure probe in the test section of the wind tunnel, the pressure probe being disposed aft of the model;
    transducing pressures exerted at respective pressure ports of the pressure probe into respective pressure signals;
    deriving from said respective pressure signals respective measured parameter values for each pressure port of a first group of said pressure ports; and
    calculating corrected parameter values for each pressure port of said first group of said pressure ports utilizing weighted parameter values calculated by multiplying said first interference factor by said respective measured parameter values for each pressure port in said first group of said pressure ports.

2. The method as recited in claim 1, wherein said first interference factor is a function of numerically simulated or empirically derived pressure signals reflected off a top of the pressure probe.

3. The method as recited in claim 1, wherein said parameter is a difference between a measured static pressure and a free-stream static pressure divided by the free-stream static pressure.

4. The method as recited in claim 1, further comprising:
    determining a value of a second interference factor associated with a second interference effect that occurs inside the test section of the wind tunnel during model testing; and
    deriving from said respective pressure signals said respective measured parameter values for each pressure port of a second group of said pressure ports located aft of said first group of said pressure ports.

5. The method as recited in claim 4, further comprising calculating corrected parameter values for each pressure port of said second group of said pressure ports of the pressure probe using a first set and a second set of weighted parameter values, the first set of weighted parameter values being calculated by multiplying said first interference factor times said measured parameter values for each pressure port of said second group, and the second set of weighted parameter values being calculated by multiplying said second interference factor times the corrected parameter value for a respective pressure port located j ports forward of each pressure port of said second group for which a corrected parameter value is being calculated, where j is a positive integer.

6. The method as recited in claim 4, wherein said second interference factor is a function of numerically simulated or empirically derived pressure signals which have interacted with an edge of the pressure probe.

7. The method as recited in claim 4, further comprising:
    determining a value of a third interference factor associated with a third interference effect that occurs inside the test section of the wind tunnel during model testing; and
    deriving from said respective pressure signals said measured parameter values for each pressure port of a third group of said pressure ports located aft of said second group of said pressure ports.

8. The method as recited in claim 7, further comprising calculating corrected parameter values for each pressure port of said third group of said pressure ports of the pressure probe by subtracting a respective weighted parameter value of a third set of weighted parameter values from, adds a respective weighted parameter value of a fourth set of weighted parameter values to, and a respective weighted parameter value of a fifth set of weighted parameter values from a respective one of said measured parameter values for each pressure port of said third group.

9. The method as recited in claim 8, wherein said third set of weighted parameter values being calculated by multiplying said first interference factor times said measured parameter values for each pressure port of said third group, said fourth set of weighted parameter values being calculated by multiplying said second interference factor times the corrected parameter value for a respective pressure port located j ports forward of each pressure port of said third group for which a corrected parameter value is being calculated, and said fifth set of weighted parameter values being calculated by multiplying said third interference factor times the corrected parameter value for a respective pressure port located k ports forward of each pressure port of said third group for which a corrected parameter value is being calculated, where k is a positive integer greater than j.

10. The method as recited in claim 7, wherein said third interference factor is a function of numerically simulated or empirically derived pressure signals which have interacted with a wall of the wind tunnel.

11. The method as recited in claim 7, further comprising aggregating said corrected parameter values for said first group, said second group and said third group of said pressure ports to form a corrected pressure signature and making said pressures available for additional calculations, display on a screen, or data archival.

12. A method for removing interference induced distortion effects to prevent limiting accuracy of test measurement hardware inside of a test section of a wind tunnel during model testing, the method comprising:
    determining respective values of first and second interference factors respectively associated with first and second interference effects;
    acquiring parameter values for each pressure port of a multiplicity of pressure ports;
    calculating corrected parameter values for each pressure port of a first group of the multiplicity of pressure ports using weighted parameter values from one or more of said acquired parameter values for each pressure port of said first group of the multiplicity of pressure ports, said weighted parameter values being calculated by multiplying said first interference factor times said acquired parameter values for each pressure port of said first group of the multiplicity of pressure ports; and
    calculating corrected parameter values for each pressure port of a second group of the multiplicity of pressure ports by subtracting a respective weighted parameter value of a first set of weighted parameter values and a respective weighted parameter value of a second set of weighted parameter values from a respective one of said acquired parameter values for each pressure port of said second group of the multiplicity of pressure ports.

13. The method as recited in claim 12, wherein said first set of weighted parameter values are calculated by multiplying said first interference factor times said acquired parameter values for each pressure port of said second group, and said second set of weighted parameter values are calculated by multiplying said second interference factor times the corrected parameter value for a respective pressure port located k ports forward of each pressure port of said second group for which a corrected parameter value is being calculated, where k is a positive integer.

14. The method as recited in claim 12, wherein said first interference factor is a function of numerically simulated or empirically derived pressure signals reflected from a pressure probe installed in a wind tunnel and said second interference factor is a function of numerically simulated or empirically derived pressure signals reflected from a wind tunnel wall.

15. The method as recited in claim 12, wherein said parameter is a difference between a static pressure and a free-stream static pressure divided by the free-stream static pressure; and wherein said parameter values are acquired by wind tunnel testing or numerical simulation of a wind tunnel testing of a model.

16. A system for reducing an off-body pressure signature of environmental effects within a wind tunnel about a test article, the system comprising a computer system programmed to perform the following operations:
  acquiring pressure data comprising measured parameter values corresponding to respective pressure ports of a pressure probe installed in a test section of a wind tunnel; and
  calculating respective corrected parameter values for each pressure port of a first group of pressure ports of the pressure probe that subtracts a respective weighted parameter value from a respective one of said acquired parameter values for each pressure port of said first group, said respective weighted parameter values being calculated by multiplying a first interference factor times said acquired parameter values for each pressure port of said first group.

17. The system as recited in claim 16, wherein said computer system is further programmed to perform the following operation: calculating corrected parameter values for each pressure port of a second group of pressure ports of the pressure probe that subtracts a respective weighted parameter value of a first set of weighted parameter values from and adds a respective weighted parameter value of a second set of weighted parameter values to a respective one of said measured parameter values for each pressure port of said second group.

18. The system as recited in claim 17, wherein said first set of weighted parameter values are calculated by multiplying said first interference factor times said acquired parameter values for each pressure port of said second group, and said second set of weighted parameter values are calculated by multiplying a second interference factor times the corrected parameter value for a respective pressure port located j ports forward of each pressure port of said second group for which a corrected parameter value is being calculated, where j is a positive integer.

19. The system as recited in claim 18, wherein said computer system is further programmed to perform the following operation: calculating corrected parameter values for each pressure port of a third group of said pressure ports of the pressure probe using a third mathematical formula that subtracts a respective weighted parameter value of a third set of weighted parameter values from, adds a respective weighted parameter value of a fourth set of weighted parameter values to, and subtracts a respective weighted parameter value of a fifth set of weighted parameter values from a respective one of said acquired parameter values for each pressure port of said third group, said third set of weighted parameter values being calculated by multiplying said first interference factor times said acquired parameter values for each pressure port of said third group, said fourth set of weighted parameter values being calculated by multiplying said second interference factor times the corrected parameter value for a respective pressure port located j ports forward of each pressure port of said third group for which a corrected parameter value is being calculated, and said fifth set of weighted parameter values being calculated by multiplying a third interference factor times the corrected parameter value for a respective pressure port located k ports forward of each pressure port of said third group for which a corrected parameter value is being calculated, where k is a positive integer greater than j.

20. The system as recited in claim 16, wherein said parameter is a difference between a measured static pressure and a free-stream static pressure divided by the free-stream static pressure.

21. A method for removing an off-body pressure signature of interference-induced distortion of a test article while air is flowing through a test section of a wind tunnel in a flow direction, comprising:
  installing a model and a pressure probe in a test section of a wind tunnel, the pressure probe being disposed aft of the model;
  transducing pressures exerted at respective pressure ports of the pressure probe into respective pressure signals;
  deriving from said respective pressure signals measured parameter values for each pressure port; and
  calculating corrected parameter values for each pressure port of a first group of pressure ports of the pressure probe that removes effects of reflections from a top of the pressure probe.

22. The method as recited in claim 21, further comprising:
  calculating corrected parameter values for each pressure port of a second group of pressure ports of the pressure probe that removes effects of reflections from a top of the pressure probe and effects of interactions with an edge of the pressure probe, the second group being located aft of the first group; and
  calculating corrected parameter values for each pressure port of a third group of pressure ports of the pressure probe that removes the effects of reflections from a top of the pressure probe, the effects of interactions with an edge or edges of the pressure probe, and the effects of reflections from a wall or walls of the wind tunnel, the third group being located aft of the second group.

23. The method as recited in claim 21, wherein said parameter is a difference between a measured static pressure and a free-stream static pressure divided by the free-stream static pressure.

24. The method as recited in claim 21, further comprising aggregating said corrected parameter values for said first group, said second group and said third group of pressure ports to form a corrected pressure signature and making said pressures available for additional calculations, display on a screen, or data archival.

* * * * *